United States Patent [19]
Bradley

[11] Patent Number: 5,455,872
[45] Date of Patent: Oct. 3, 1995

[54] SYSTEM AND METHOD FOR ENHANCED CHARACTER RECOGNGITION ACCURACY BY ADAPTIVE PROBABILITY WEIGHTING

[75] Inventor: Martin P. T. Bradley, Laytonsville, Md.

[73] Assignee: International Business Machines Corporation, Armonk, N.Y.

[21] Appl. No.: 51,972

[22] Filed: Apr. 26, 1993

[51] Int. Cl.$^6$ ............................................. G06K 9/62
[52] U.S. Cl. .................................... 382/228; 382/309
[58] Field of Search ........................... 382/36, 38, 39, 382/57, 61, 10, 27, 37, 30; 395/149

[56] References Cited

U.S. PATENT DOCUMENTS

| | | | |
|---|---|---|---|
| 4,032,887 | 6/1977 | Roberts | 382/57 |
| 4,773,099 | 9/1988 | Bokser | 382/38 |
| 4,876,735 | 9/1991 | Martin et al. | 382/57 |
| 4,958,375 | 9/1990 | Reilly et al. | 382/36 |
| 5,052,043 | 9/1991 | Gaborski et al. | 382/14 |
| 5,081,690 | 1/1992 | Tan | 382/30 |
| 5,257,323 | 10/1993 | Melen et al. | 382/57 |

Primary Examiner—Joseph Mancuso
Assistant Examiner—Jon Chang
Attorney, Agent, or Firm—John E. Hoel; Joseph C. Redmond, Jr.

[57] ABSTRACT

A data processing system and method are disclosed for selecting which one of several character recognition programs should be used to optimize the accuracy in recognizing characters in a field in an image of a document form. Consideration is taken of the character form and field type for particular characters and an optimized selection is performed on a realtime basis among the several candidate character recognition programs which could be applied. The resulting character recognition operation has its accuracy maximized for reading a wide variety of character forms and field types in recognition of preprinted forms.

25 Claims, 13 Drawing Sheets

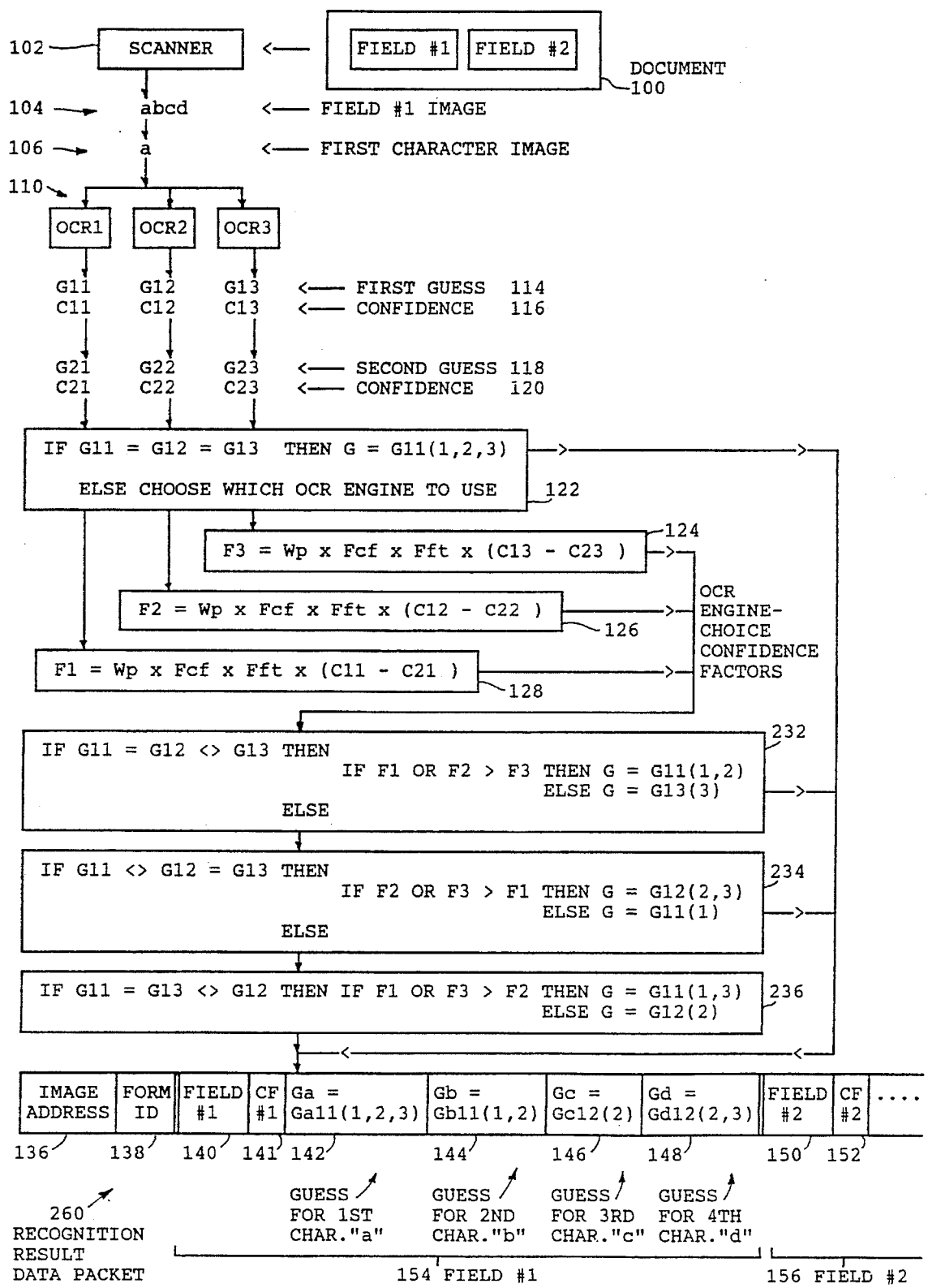

FIG. 8A

| CHAR FORM CF | FIELD TYPE FT | OCR #1 | OCR #2 | OCR #3 |
|---|---|---|---|---|
| 1 | 1 | EC(1,1,1) | EC(1,1,2) | EC(1,1,3) |
| 1 | 2 | EC(1,2,1) | EC(1,2,2) | EC(1,2,3) |
| 1 | 3 | EC(1,3,1) | EC(1,3,2) | EC(1,3,3) |
| 2 | 1 | EC(2,1,1) | EC(2,1,2) | EC(2,1,3) |
| 2 | 2 | EC(2,2,1) | EC(2,2,2) | EC(2,2,3) |
| 2 | 3 | EC(2,3,1) | EC(2,3,2) | EC(2,3,3) |
| 3 | 1 | EC(3,1,1) | EC(3,1,2) | EC(3,1,3) |
| 3 | 2 | EC(3,2,1) | EC(3,2,2) | EC(3,2,3) |
| 3 | 3 | EC(3,3,1) | EC(3,3,2) | EC(3,3,3) |

800

ERROR COUNTS FOR SAMPLED PACKETS

FIG. 8B

| CHAR FORM CF | FIELD TYPE FT | OCR #1 | OCR #2 | OCR #3 |
|---|---|---|---|---|
| 1 | 1 | $\Sigma EC(1,1,1)$ | $\Sigma EC(1,1,2)$ | $\Sigma EC(1,1,3)$ |
| 1 | 2 | $\Sigma EC(1,2,1)$ | $\Sigma EC(1,2,2)$ | $\Sigma EC(1,2,3)$ |
| 1 | 3 | $\Sigma EC(1,3,1)$ | $\Sigma EC(1,3,2)$ | $\Sigma EC(1,3,3)$ |
| 2 | 1 | $\Sigma EC(2,1,1)$ | $\Sigma EC(2,1,2)$ | $\Sigma EC(2,1,3)$ |
| 2 | 2 | $\Sigma EC(2,2,1)$ | $\Sigma EC(2,2,2)$ | $\Sigma EC(2,2,3)$ |
| 2 | 3 | $\Sigma EC(2,3,1)$ | $\Sigma EC(2,3,2)$ | $\Sigma EC(2,3,3)$ |
| 3 | 1 | $\Sigma EC(3,1,1)$ | $\Sigma EC(3,1,2)$ | $\Sigma EC(3,1,3)$ |
| 3 | 2 | $\Sigma EC(3,2,1)$ | $\Sigma EC(3,2,2)$ | $\Sigma EC(3,2,3)$ |
| 3 | 3 | $\Sigma EC(3,3,1)$ | $\Sigma EC(3,3,2)$ | $\Sigma EC(3,3,3)$ |

802

TOTAL CHARACTERS SAMPLED TO DATE

| CHAR FORM CF | FIELD TYPE FT | OCR #1 | OCR #2 | OCR #3 |
|---|---|---|---|---|
| 1 | 1 | Wp1(1,1,1) | Wp1(1,1,2) | Wp1(1,1,3) |
| 1 | 2 | Wp1(1,2,1) | Wp1(1,2,2) | Wp1(1,2,3) |
| 1 | 3 | Wp1(1,3,1) | Wp1(1,3,2) | Wp1(1,3,3) |
| 2 | 1 | Wp1(2,1,1) | Wp1(2,1,2) | Wp1(2,1,3) |
| 2 | 2 | Wp1(2,2,1) | Wp1(2,2,2) | Wp1(2,2,3) |
| 2 | 3 | Wp1(2,3,1) | Wp1(2,3,2) | Wp1(2,3,3) |
| 3 | 1 | Wp1(3,1,1) | Wp1(3,1,2) | Wp1(3,1,3) |
| 3 | 2 | Wp1(3,2,1) | Wp1(3,2,2) | Wp1(3,2,3) |
| 3 | 3 | Wp1(3,3,1) | Wp1(3,3,2) | Wp1(3,3,3) |

EXISTING ADAPTIVE PROBABILITY WEIGHTS

FIG. 8D

| CHAR FORM CF | FIELD TYPE FT | OCR #1 | OCR #2 | OCR #3 |
|---|---|---|---|---|
| 1 | 1 | Wp2(1,1,1) | Wp2(1,1,2) | Wp2(1,1,3) |
| 1 | 2 | Wp2(1,2,1) | Wp2(1,2,2) | Wp2(1,2,3) |
| 1 | 3 | Wp2(1,3,1) | Wp2(1,3,2) | Wp2(1,3,3) |
| 2 | 1 | Wp2(2,1,1) | Wp2(2,1,2) | Wp2(2,1,3) |
| 2 | 2 | Wp2(2,2,1) | Wp2(2,2,2) | Wp2(2,2,3) |
| 2 | 3 | Wp2(2,3,1) | Wp2(2,3,2) | Wp2(2,3,3) |
| 3 | 1 | Wp2(3,1,1) | Wp2(3,1,2) | Wp2(3,1,3) |
| 3 | 2 | Wp2(3,2,1) | Wp2(3,2,2) | Wp2(3,2,3) |
| 3 | 3 | Wp2(3,3,1) | Wp2(3,3,2) | Wp2(3,3,3) |

810

NEW ADAPTIVE PROBABILITY WEIGHTS

| CHAR FORM CF | OCR #1 | OCR #2 | OCR #3 |
|---|---|---|---|
| 1 | Fcf(1,1) | Fcf(1,2) | Fcf(1,3) |
| 2 | Fcf(2,1) | Fcf(2,2) | Fcf(2,3) |
| 3 | Fcf(3,1) | Fcf(3,2) | Fcf(3,3) |

CHARACTER FORM CONFIDENCE FACTORS

| FIELD TYPE FT | OCR #1 | OCR #2 | OCR #3 |
|---|---|---|---|
| 1 | Fft(1,1) | Fft(1,2) | Fft(1,3) |
| 2 | Fft(2,1) | Fft(2,2) | Fft(2,3) |
| 3 | Fft(3,1) | Fft(3,2) | Fft(3,3) |

FIELD TYPE CONFIDENCE FACTORS

SYSTEM AND METHOD FOR ENHANCED CHARACTER RECOGNGITION ACCURACY BY ADAPTIVE PROBABILITY WEIGHTING

BACKGROUND OF THE INVENTION

1. Technical Field

The invention disclosed broadly relates to data processing systems and more particularly relates to character recognition of images of text.

2. Related Patents and Patent Applications

This patent application is related to the copending U.S. patent application, Ser. No. 07/870,129, filed Apr. 15, 1992, now U.S. Pat. No. 5,251,273, entitled "Data Processing System and Method for Sequentially Repairing Character Recognition Errors for Scanned Images of Document Forms," by T. S. Betts, et al., the application being assigned to the IBM Corporation and incorporated herein by reference.

This patent application is also related to the copending U.S. patent application, Ser. No. 07/870,507, filed Apr. 17, 1992, now U.S. Pat. No. 5,305,396, entitled "Data Processing System and Method for Selecting Customized Character Recognition Processes and Coded Data Repair Processes for Scanned Images of Document Forms," by T. S. Betts, et al., the application being assigned to the IBM Corporation and incorporated herein by reference.

This patent application is also related to the copending U.S. patent application, Ser. No. 07/305,828, filed Feb. 2, 1989, now U.S. Pat. No. 5,140,650, entitled "A Computer Implemented Method for Automatic Extraction of Data From Printed Forms," by R. G. Casey, et al., the application being assigned to the IBM Corporation and incorporated herein by reference.

3. Background Art

The character recognition of images of text is a technology which has been extensively developed in the data processing area. There are many commercially available character recognition computer programs and devices which take an image of alphanumeric text and convert it to a string of alphanumeric coded data characters. Each commercially available character recognition product is usually characterized by its manufacturer as having certain strengths for which is more appropriately suited. Some character recognition programs are excellent at converting images of machine impact printing into coded data character strings, however, fail at converting dot matrix characters. Other character recognition programs are designed for converting handprinted characters either constrained within the outline of a rectangular box or unconstrained handprinted characters, and these particular character recognition programs fail at other types of character forms. The category of character forms such as machine impact printing, dot matrix printing, constrained handprinting or unconstrained handprinting and the like are considered variations of character forms. Another category of variation in text for which some character recognition programs are more accurate than others, is the category of field types. Field types are for example an all numeric field, or an all alphabetic field consisting entirely of uppercase letters, or alternately an all lowercase alphabetic field, or still another type is a mixed alphabetic field of some capital letters and some lowercase letters, and the like. Some character recognition programs are much stronger at accurately converting numeric fields, than they are at converting alphabetic or mixed fields of characters. The reason for the limited ability of character recognition programs to perform well on a wide variety of character forms and field types, is that character recognition programs are typically based on a single or limited number of character recognition algorithms, such as pattern recognition, neural net, character feature, or other character recognition algorithms.

This limitation in the diversity of character forms and field types for which existing character recognition programs are useful, creates a problem when a variety of text forms is to be analyzed. What is needed is a method to overcome the weaknesses of single character recognition products, so as to enhance the overall performance of a system which must analyze a wide variety of character forms and field types.

OBJECTS OF THE INVENTION

It is therefore an object of the invention to provide an improved method for accurately character recognizing text having a wide variety of character forms and field types.

It is another object of the invention to overcome the weaknesses of single character recognition program products, to enhance the performance of a system which must recognize characters from a wide variety of character forms and field types.

SUMMARY OF THE INVENTION

These and other objects, features and advantages are accomplished by the system and method for enhanced character recognition accuracy by adaptive probability weighting. A data processing system and method are disclosed, which includes a document image input device such as a scanner, a forms recognition program, a field extraction program, and a plurality of character recognition programs. The invention is a system and a method for selecting which one of the plurality of character recognition programs to use for the characters in a field in an image of a document form.

Each character recognition program has certain strengths and other weaknesses in recognizing character forms such as machine impact printing, dot matrix printing, constrained handprinting, unconstrained handprinting and the like. These strengths and weaknesses are characterized by a table of character form confidence factors which are input to the data processing system, for each of the plurality of character recognition programs.

Similarly, each character recognition program has certain strengths and other weaknesses in recognizing field types such as numeric, alphabetic (all capitals or all lower case or mixed), mixed alphabetic and numeric, and the like. These strengths and weaknesses are characterized by a table of field type confidence factors which are input to the data processing system, for each of the plurality of character recognition programs.

Since the original estimates of the strengths and weaknesses of a particular character recognition program may not be accurate, the invention disclosed herein provides a way to modify the estimates of these strengths, through the use of an adaptive probability weighting factor for each of the plurality of character recognition programs. The adaptive probability weighting factor enables a more precise selection of the best of several character recognition programs when they are applied to particular combinations of character forms and field types. Since this combination can change from one field to the next on a form, the invention provides for the rapid application of different adaptive probability weighting factors as consecutive fields are analyzed on a form.

Each of the character recognition programs generates a first guess character and first confidence value and a second guess character and second confidence value in the data processing system.

The data processing system then computes an OCR engine choice confidence factor as the product of the character form confidence factor, the field type confidence factor, and the adaptive probability weighting factor, times the difference between the first confidence value and the second confidence value. This is done for each of the character recognition programs under consideration for the particular field being analyzed.

The data processing system then selects which one of the plurality of character recognition programs has a maximum value for the OCR engine choice confidence factor. The best guess of the characters in the field are then selected and inserted into a recognition result data packet, to be used as the coded data representation of the information in the image of the field analyzed.

The data processing system also includes a monitoring and correction station which samples the recognition result data packets. This can be done at a manual station by an operator viewing both the coded data from the packet and the original image of the filled-out form. It may alternately be done by an automatic error detection program for certain types of fields such as combinations of state names and zip codes, which can be cross-checked in a zip code directory. As errors are identified, the identity of the character recognition programs which produced the error is noted and a running count is maintained of which character recognition program produced the error for the particular combination of character form and field type. These error counts are retained in an error count table.

At the end of the day, for example, the data processing system updates the adaptive probability weighting factor by computing a new value for the adaptive probability weighting factor for each of the plurality of character recognition programs, by modifying the existing adaptive probability weighting factor with a value derived from the error count. This is done for each combination of character form and field type.

In this manner, the invention disclosed herein provides a way to modify the estimates of the strengths of each character recognition program, through the use of an adaptive probability weighting factor for each of the plurality of character recognition programs.

DESCRIPTION OF THE FIGURES

These and other objects, features and advantages will be more fully appreciated with reference to the accompanying figures.

FIG. 1 is a generalized logic flow diagram of the invention.

FIG. 8A illustrates a table 800 of the error counts for sample packets.

FIG. 8B illustrates a table of total characters sampled to date.

FIG. 8C illustrates a table of the existing adaptive probability weights.

FIG. 8D illustrates a table of the new adaptive probability weights.

FIG. 9A illustrates a table of the character form confidence factors.

FIG. 9B illustrates a table of field type confidence factors.

DISCUSSION OF THE PREFERRED EMBODIMENT

Figure 2A:
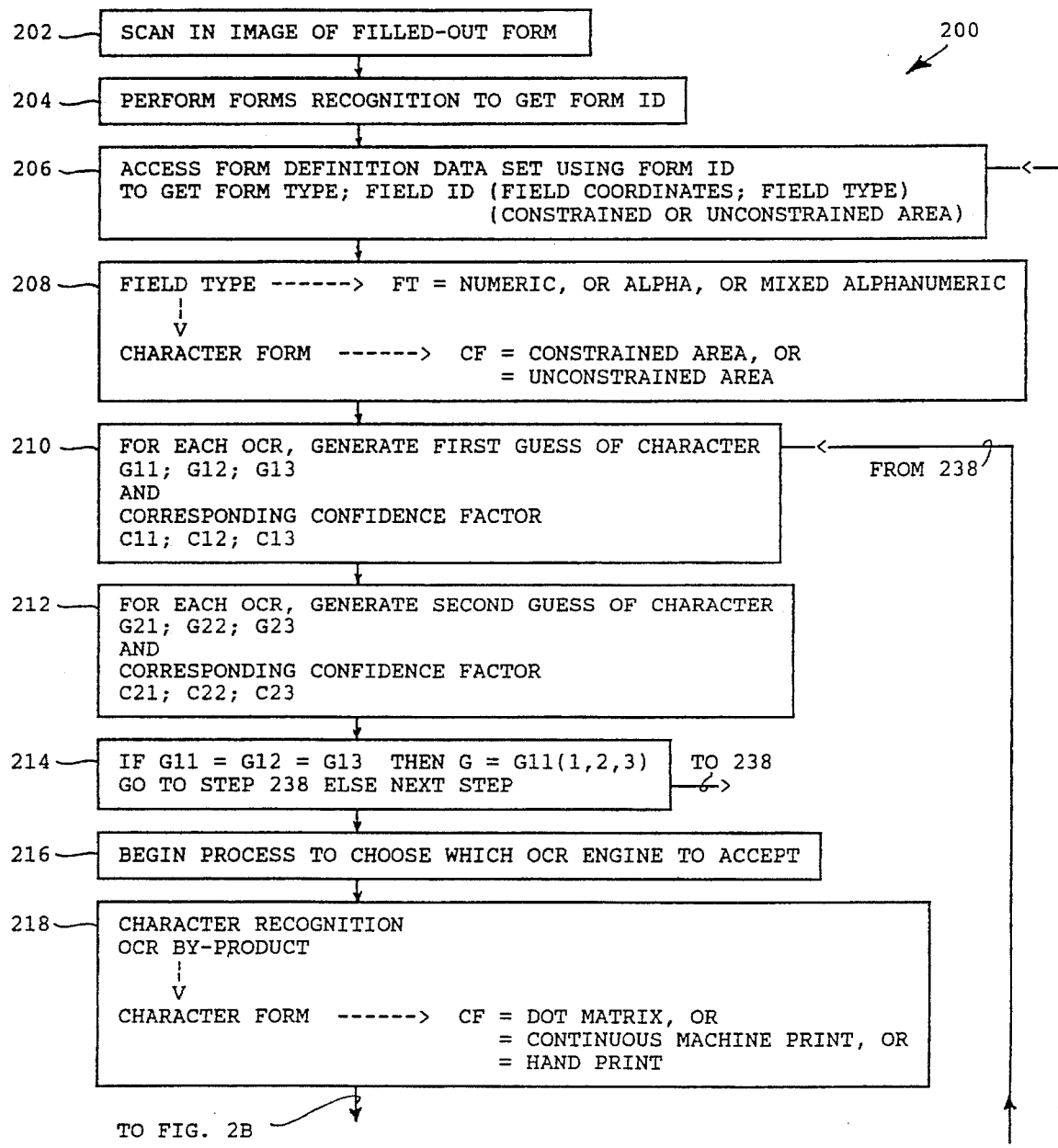
FIG. 2A and FIG. 2B form a more detailed flow diagram of the recognition station program 200.
Figure 2B:
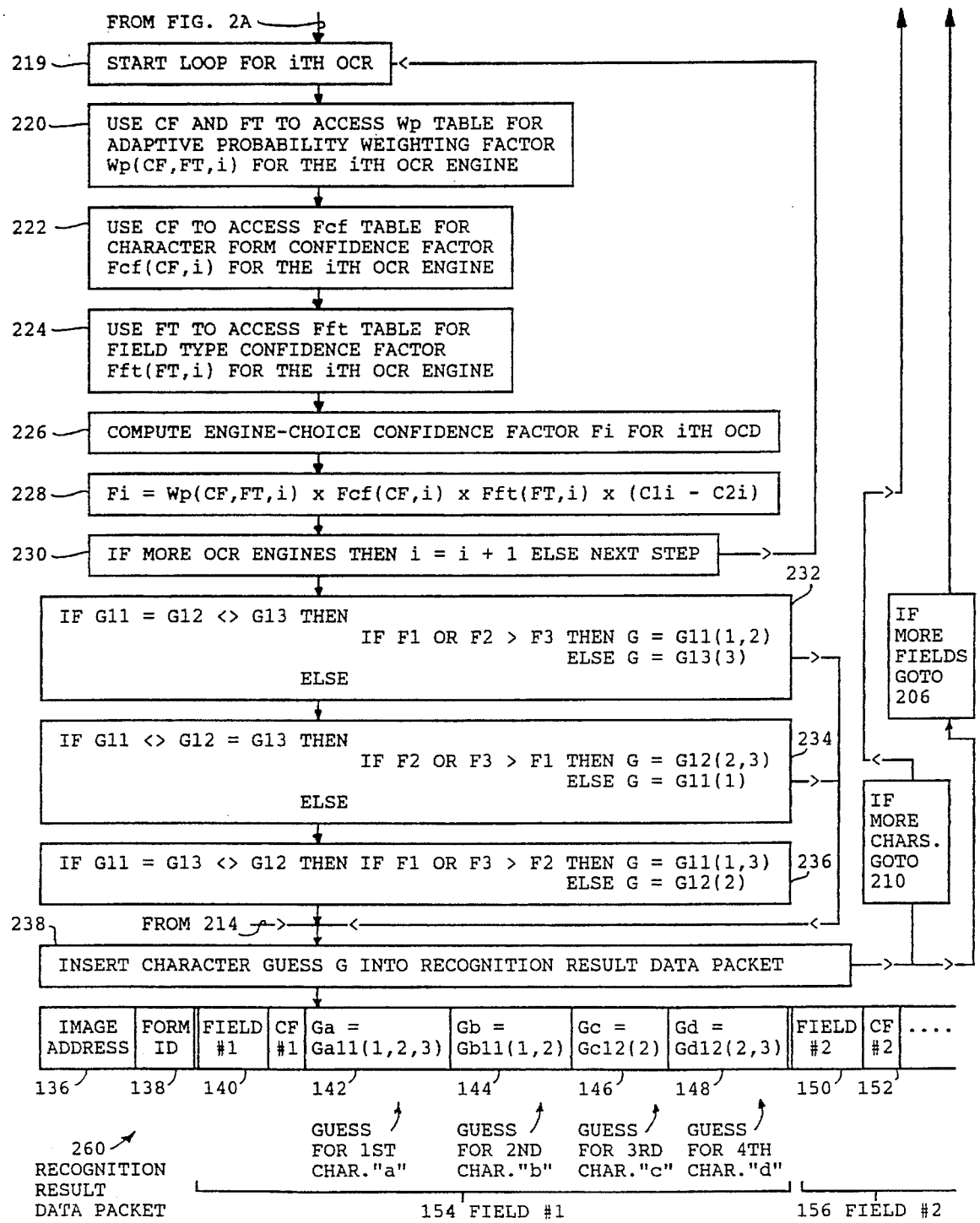
Figure 3:
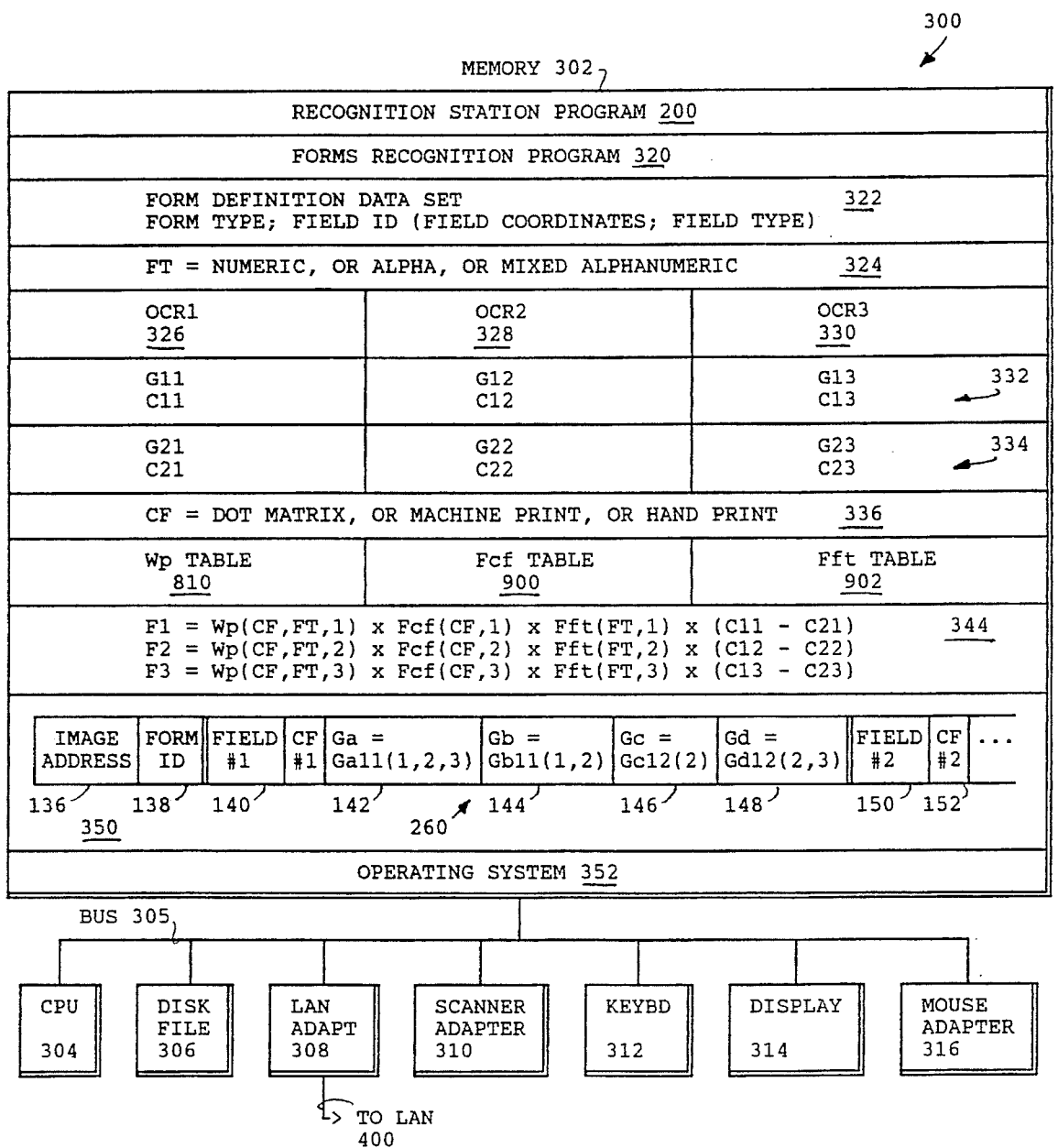
FIG. 3 is an architectural diagram of the recognition station 300.
Figure 4:
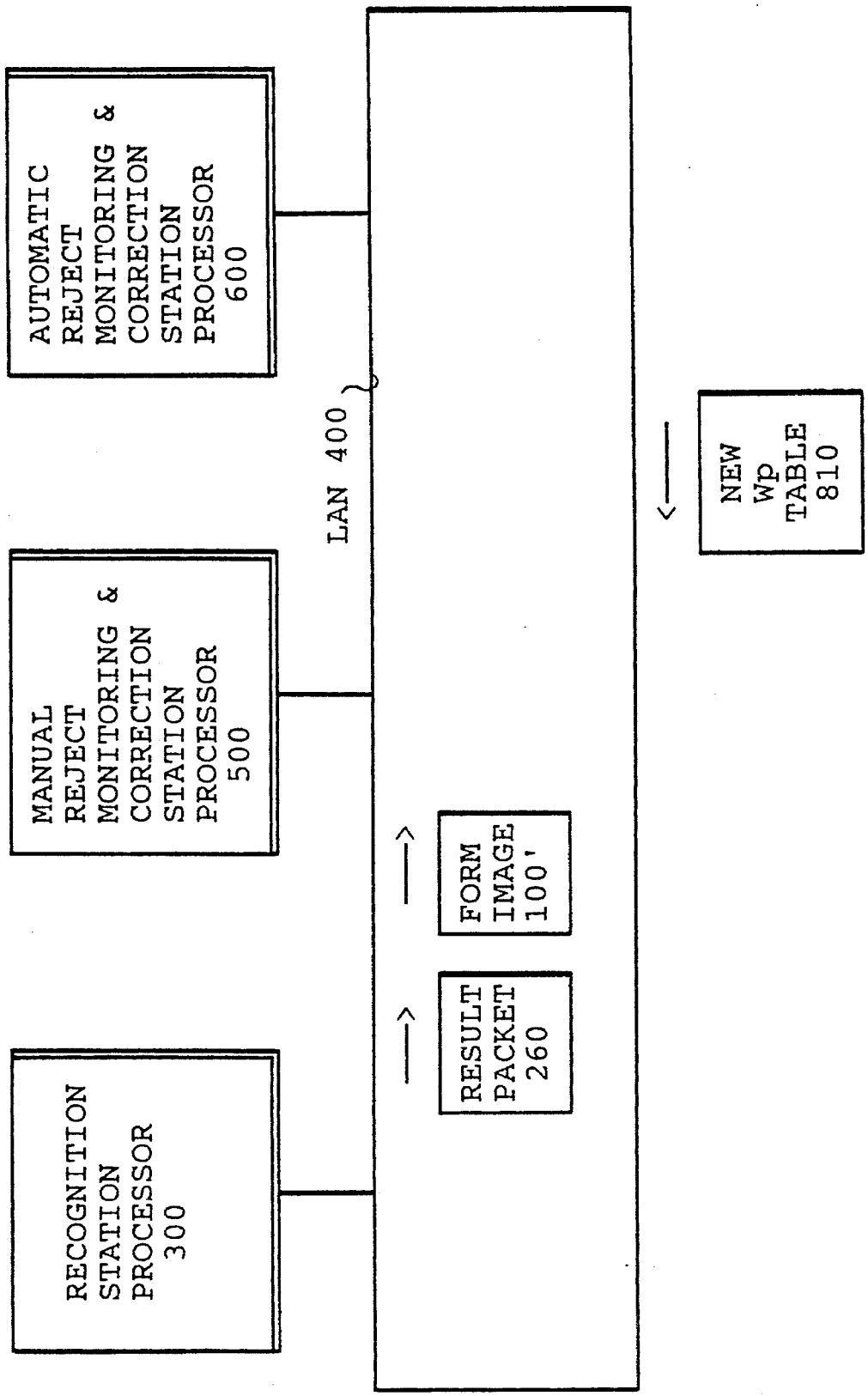
FIG. 4 is an architectural diagram of a local area network 400 which includes the recognition station processor 300 and the reject monitoring and correction station processor 500.
Figure 5:
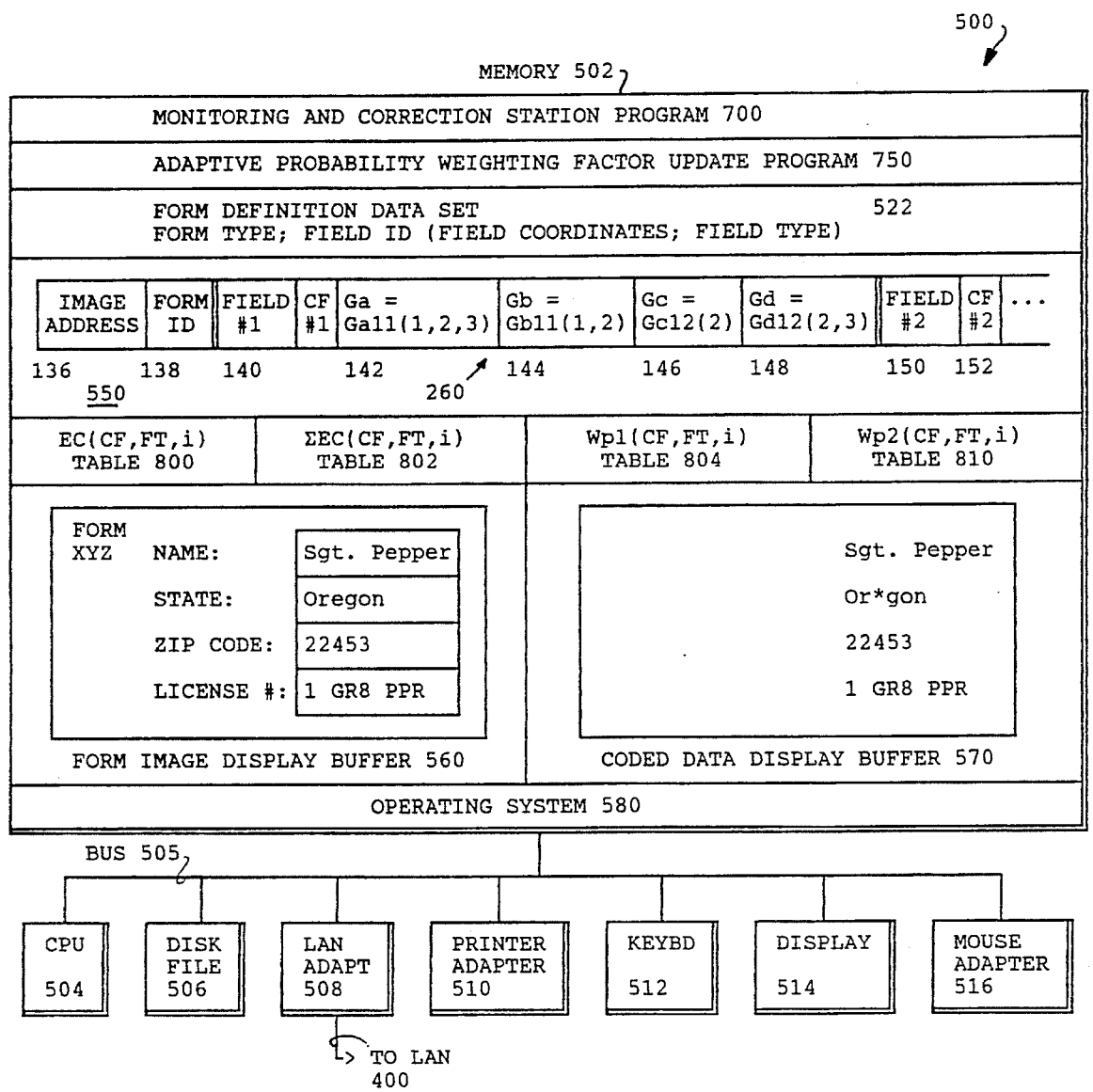
FIG. 5 is an architectural diagram of the monitoring and correction station 500.

FIG. 1 is a generalized flow diagram and FIG. 2 is a more detailed flow diagram of the sequence of operational steps carried out by the recognition station 300 of FIG. 3. Recognition station 300 is connected to the local area network (LAN) 400, as shown in FIG. 4, and produces a result packet 260 and the form image 100' from scanning a document to produce a document image. The typical documents scanned by the recognition station processor 300 are forms which have predefined fields located at predefined locations having predefined field types, all of which are specified by a form definition data set. The local area network 400 of FIG. 4 transfers the result packet 260 and the form image 100' to either a manual reject monitoring and correction station processor 500 or an automatic rejection monitoring and correction station processor 600. The monitoring and correction station processor will accumulate errors which have occurred in character recognition operations carried out at the recognition station processor 300, and will prepare a new weighting table 810 which is transferred over the local area network 400 back to the recognition station processor 300. FIG. 5 shows the monitoring and correction station 500 which monitors the errors in character recognition and produces a updated weighting table for the recognition station processor.

Returning to FIG. 1, the scanner 102 will scan the document 100 producing a digitized image of the document 100. The document 100 is a predefined form having at least two fields shown as field #1 and field #2. The image of field #1 as shown in FIG. 1 is the string abcd 104. The first character "a" 106 is shown in FIG. 1 as being applied to the inputs of three OCRs or character recognition devices 110, OCR1, OCR2 and OCR3. Each of these character recognition devices performs its character recognition operations on the input character image 106 and produces a first guess character 114 and a corresponding confidence value 116 and it also produces a second guess character 118 and the corresponding confidence value 120. The terminology has been chosen herein to represent the first guess character for OCR1 as G11 and its corresponding confidence value as C11 and the second guess character for the OCR1 as G21 and its corresponding confidence value as C21. The corresponding first guess and confidence and second guess and confidence values for OCR2 and for OCR3 are also shown in FIG. 1.

Step 122 of FIG. 1 determines if the first guess for each of the three character recognition devices 110 is the same guess, for example if OCR1, OCR2 and OCR3 have all produced a first guess 114 that the input character image 106 of "a" is in fact guessed as "a," then step 122 flows to the formulation of the recognition result data packet 260. The recognition result data packet 260 shown in FIG. 1 is a data envelope which is constructed by the recognition station processor 300. The recognition result data packet 260 includes the image address 136, the identity of the form 138, which is the document 100, field #1 which is 140, the character form number 1, which is typically determined by one or more of the character recognition devices 110, and inserted into the field 141. The field 142 contains the guess for the first character which includes both the character which is guessed and also the identity of each of the character recognition devices 110 which have produced that particular guess. For example, the field 142 is shown in FIG. 1 as containing the guess GA11 for the OCR1 and also the fact that all three character recognition devices 110, that is OCR1, OCR2 and OCR3, have all guessed the same character which is "a." The field 144 contains the guess for the second character "b" in the string image 104. The guess for the second character is GB11 and in this example, the first and second recognition devices 110, that is OCR1 and OCR2, have both guessed that the character is "b." The third engine or OCR3 has not guessed the same character and has not been chosen for representation of the second character. Inspection of the recognition result data packet 260 in FIG. 1 will show that a single OCR2 generated the third guess in field 146 and that two of the recognition devices OCR2 and OCR3 have guessed the character in field 148 for the fourth character. This constitutes field #1 which is designated as the portion 154 of the recognition result data packet 260. The second field #2 which is designated as 156, includes the field #2 which is referred to as 150 and the character form number 2 information which is referred to as 152. The character form information is typically generated by the character recognition devices 110.

In step 122, if the decision is not unanimous among the character recognition devices 110 as to the first guess character 114, then the method flows to steps 124, 126 and 128 which compute the OCR engine choice confidence factors F1, F2 and F3. The engine choice confidence factor enables the system to choose which one or several of the character recognition engines are to be selected as having the best guess of the character which has been analyzed, when the decision is not unanimous among the character recognition devices. The computation of the engine choice confidence factor is based upon the character form confidence factor Fcf which characterizes the ability of each particular character recognition device to accurately recognize characters for each particular character form CF. An example of table of character form confidence factors 900 is shown in FIG. 9A. The computation of the engine choice confidence factors is also based upon the field type confidence factor Fft, which characterizes each respective recognition device for its ability to accurately recognize each particular field type. An example of field type confidence factors is shown in table 902 of FIG. 9B. For example, for three commercially available character recognition programs, the character form confidence factor for machine impact printing is 99%, 95%, 99%. For dot matrix characters they are 70%, 90% and 90%, respectively. For constrained handprint characters they are 30%, 95% and 99%, respectively. For unconstrained handprint characters they are 20%, 85% and 90%, respectively. The same three character recognition programs, in the same order, have field type confidence factors for numeric characters of 100%, 100% and 100%, respectively. For all capital alphabetic characters, they have 98%, 98% and 80%, respectively. For mixed capital alphabetic and numeric characters, they have 90%, 97% and 50%, respectively.

The engine choice confidence factors computed in FIG. 1, also are based upon the probability of substitution of the second guess character for the first guess character. This is established by taking the difference between the confidence value for the first guess character from the confidence value for the second guess character for the output of a particular character recognition engine analyzing a particular character image.

The engine choice confidence factor is computed as the product of the character form confidence factor, the field type confidence factor, times the difference between the first confidence value and the second confidence value for a particular guess. Then, this product is multiplied times the adaptive probability weighting factor.

The adaptive probability weighting factor Wp is used as the way to adjust the selection of a particular character recognition processor over a period of time, with respect to the other character recognition processors in the system, based upon their long-term capability to provide accurate recognition of particular character forms and field types. The initial value of the adaptive probability weighting factor is set equal to one, and over time, as the behavior of the respective character recognition devices is monitored, the value of the adaptive probability weighting factor is adjusted so as to allow the selection of the best character recognition program for a particular combination of character form and field type.

In FIG. 1, after the engine choice confidence factors F1, F2, and F3 are computed in steps 124, 126 and 128 for the character recognition engines OCR1, OCR2 and OCR3, respectively, the method flows to step 232. In step 232, it is determined if the first guess for OCR1 and OCR2 is the same and not equal to the guess for OCR3. If that is true, then if either the engine choice confidence factors F1 or F2 is greater than F3, then the guess G is set equal to the guess for either OCR1 or OCR2, G11(1,2). If F3 is greater than both F1 and F2, then the OCR3 must be the best guess for this character and thus G is set equal to G13(3). The program then flows to the formulation of the recognition result data packet to 60 which inserts the best guess into the appropriate field in 154.

If step 232 is not satisfied, then the program flows to step 234 which determines if the first guess for OCR2 is equal to the first guess for OCR3 and that they are not equal to the first guess for OCR1. If this is the case, then it is determined whether the engine choice confidence factor F2 or F3 is greater than F1, and if it is, then the guess G is set equal to the first guess for either OCR2 or OCR3 which is G12(2,3). If F1 is greater than both F2 and F3, then G is set equal to the best guess which is the output of OCR1 which is G11(1). The program then flows to the formulation of the recognition result data packet 260.

If step 234 is not satisfied, then the program flows to step 236 which determines if the output of the first guess 114 for OCR1 is the same as the first guess OCR3 and that they are not the same as the first guess for OCR2. If this is the case, then step 236 determines if the engine choice confidence factor F1 or F3 is greater than F2 and if it is, then the best guess G is set equal to either the output of OCR1 or the output of OCR3 which is G11(1,3). If it is not, that is if F2 is greater than F1 and F3, then G is set equal to the output of OCR2 which is G12(2). Step 236 then flows to the formulation of the recognition result data packet 260.

FIGS. 2A and 2B provide a more detailed flow diagram of the sequence of operational steps for the recognition station program 200. Step 202 scans in the image of the filled-out form. Step 204 performs the forms recognition to get the form ID. Step 206 accesses the form definition data set using form ID, to get the form type, the field ID and the field coordinates and field type for each particular field. In addition, the form definition data set may also include information on whether a field is a constrained unconstrained area. Then step 208 takes the field type and determines whether the field type is numeric or is alphabetical and if so, is all capitals or mixed uppercase or lowercase, or whether the field is a mixed alphabetic and numeric field. The field type information provided by the form definition data set may also include some character form information, such as if the field is a constrained area, then if any handprinted characters are found in the field, they will either be a constrained handprint or unconstrained handprint, both of which are character form attributes.

Then the method of FIG. 2A flows to step 210 which has each respective character recognition program 110 generate its first guess of the character G11, G12 and G13 and the corresponding confidence factors C11, C12 and C13. Then step 212 has each respective character recognition program 110 generate a second guess of the character G21, G22 and G23 and the corresponding confidence factors C21, C22 and C23.

Then step 214 of FIG. 2A determines if G11 equals G12 equals G13, which would occur if the first guess for all three of the character recognition programs OCR1, OCR2 and OCR3 were the same. If this is the case, then the program flows to step 238. However, if this is not the case, then the program flows to step 216 which begins the process to choose which character recognition engine to accept for this particular character being analyzed. Step 218 has each of the character recognition engine perform its analysis and output as a bi-product a guess of the character form. This can be a guess as to whether the character form is dot matrix, or a continuous machine print, or a handprint. Commercial character recognition programs typically provide this kind of output which is fairly easily determined by conventional character recognition algorithms. For example, a dot matrix character form has a very different picture element organization than does a continuous machine print character form. This information is output as the value CF and is generally in agreement for all of the character recognition programs in the system. If there happens to be a disagreement among the character recognition engines as to the character form CF for a particular being analyzed, then a vote can be conducted and that character form CF for which the majority of the character recognition programs output, will be selected as the value of CF to use in the program of FIGS. 2A and 2B.

The program of 2A then flows to FIG. 2B where step 219 starts a loop which goes between 219 and step 230, to compute the engine choice confidence factors Fi for the ith character recognition device (OCD) or OCR110. Step 220 uses the character form CF and the field type FT to access the adaptive probability weighting factor Wp table shown in FIG. 8C for the ith OCR engine, that is the ith character recognition device 110. Then the step 222 uses the character form CF to access the character form confidence factor Fcf from the table 900 shown in FIG. 9A for the ith OCR engine or character recognition program 110. Then the steps 226 and 228 compute the engine choice confidence factor Fi for the ith character recognition program 110. It is seen in step 228 that the engine choice confidence factor Fi is computed as the product of the adaptive probability weighting factor Wp times the character form confidence factor Fcf times the field type confidence factor Fft times the difference between the first guess confidence factor and the second guess confidence factor or C11 minus C21, for the first OCR1. Then step 230 determines if there are any more character recognition programs in the system for which an engine choice confidence factor must be computed. If there is, then the index value "i" is incremented by one and the program flows to step 219. Alternately, the program flows to step 232.

Steps 232, 234 and 236 perform in the same manner as previously described, where a particular value G for the best guess among the three first guess outputs of the three character recognition programs OCR1, OCR2 and OCR3, is identified. Then the steps 232,234, or 236, when satisfied, flow to step 238 to insert the character guess G into the recognition result data packet 260.

If there are more characters in the field being analyzed, then the program flows to step 210. If there are more fields in the form being analyzed, then the program flows to step 206. After all of the fields in the form being analyzed have been processed in this manner, then the recognition result data packet 260 contains the best guess for each of the characters in each of the fields of the form. The recognition result data packet 260 is then output by the recognition station processor 300 for utilization by the data processing system which will operate upon the alphanumeric coded data character strings to perform the applications for which it is programmed.

FIG. 3 shows the recognition station processor 300. It includes the memory 302, which is connected by the bus 305 to the CPU 304. Also connected to the bus 305 is the disk file 306, the LAN adapter 308 which is connected to the LAN 400 also connected to the bus 305 is the scanner adapter 310 which is connected to a scanning device which converts a hard copy document form such as document 100 into the digitized image 100' of that document form. The keyboard 312 is also connected to the bus 305, as is the display 314 and the mouse adapter 316.

The memory 302 includes the recognition station program 200, the forms recognition program 320, the form definition data set partition 322, partitions 326, 328 and 330 for the character recognition programs for OCR1, OCR2 and OCR3. Partition 332 provides for the storage of the first guess and confidence factors G11 and C11 for OCR1, G12 and C12 for OCR2, and G13 and C13 for OCR3. The partition 334 provides similar storage for the second guess characters and their corresponding confidence factors for OCR1, OCR2 and OCR3.

Also included in the memory 302 is a partition 336 for the character form CF along with the partition 324 for the form type FT. The adaptive probability weighting table 810 is stored in the memory 302, along with the character form confidence factor table 900 and the field type confidence factor table 902. The partition 344 provides a workplace and storage location for the OCR engine choice confidence factors F1, F2 and F3. The partition 350 provides for the assembly and storage of the recognition result data packet 260.

The operating system 352 is also stored in the memory 302. The programs stored in the memory 302 are each sequences of executable instructions representing the corresponding sequences of operational steps, which are executable in the CPU 304 to perform the intended functions and operations. As a result, the recognition station processor 300 outputs the recognition result data packet 260 to the local area network 400 for utilization by other processors in the system.

FIG. 4 shows the local area network 400 which interconnects the recognition station processor 300 shown in FIG. 3 to the manual reject monitor and correction station processor 500 shown in FIG. 5. The result packet 260 and the form image 100' are transferred from the recognition station processor 300 to the monitoring and correction station processor 500.

FIG. 5 shows the monitoring and correction station processor 500, which includes the memory 502 connected over the bus 505 to the CPU 504. Also connected to the bus 505 is the disk file 506 and the LAN adapter 508 which is connected to the LAN 400. Also connected to the bus 505 is the printer adapter 510, the keyboard 512, the display 514 and the mouse adapter 516.

Stored in the memory 502 is the monitoring and correction station program 700 and the adaptive probability weighting factor update program 750. The partition 522 stores the form definition data set, partition 520 stores the recognition result data packet 260 which is received over the local area network 400 from the recognition station processor 300. Also included in the memory 502 are partitions for the storage of the error count for sampled packets table 800 of FIG. 8A, the total characters sampled to date table 802 shown in FIG. 8B, the existing adaptive probability weights table 804 shown in FIG. 8C, and the new adaptive probability weights table 810 shown in FIG. 8D. In addition, a form image display buffer 650 shows the image of the form XYZ stored therein, the form including a name field, a state field, a zip code field and a license number field. Also included in the memory 502 is a coded data display buffer 570 which contains the coded data character strings which have been extracted from the recognition result data packet 260, those fields corresponding the fields appearing in the image stored in the form image display buffer 560. Also included in the memory 502 is the operating system 580. The programs stored in the memory 502 are sequences of executable instructions which represent sequences of operational steps, which are executed by the CPU 504, to carry out the intended functions to be performed.

Figure 6:
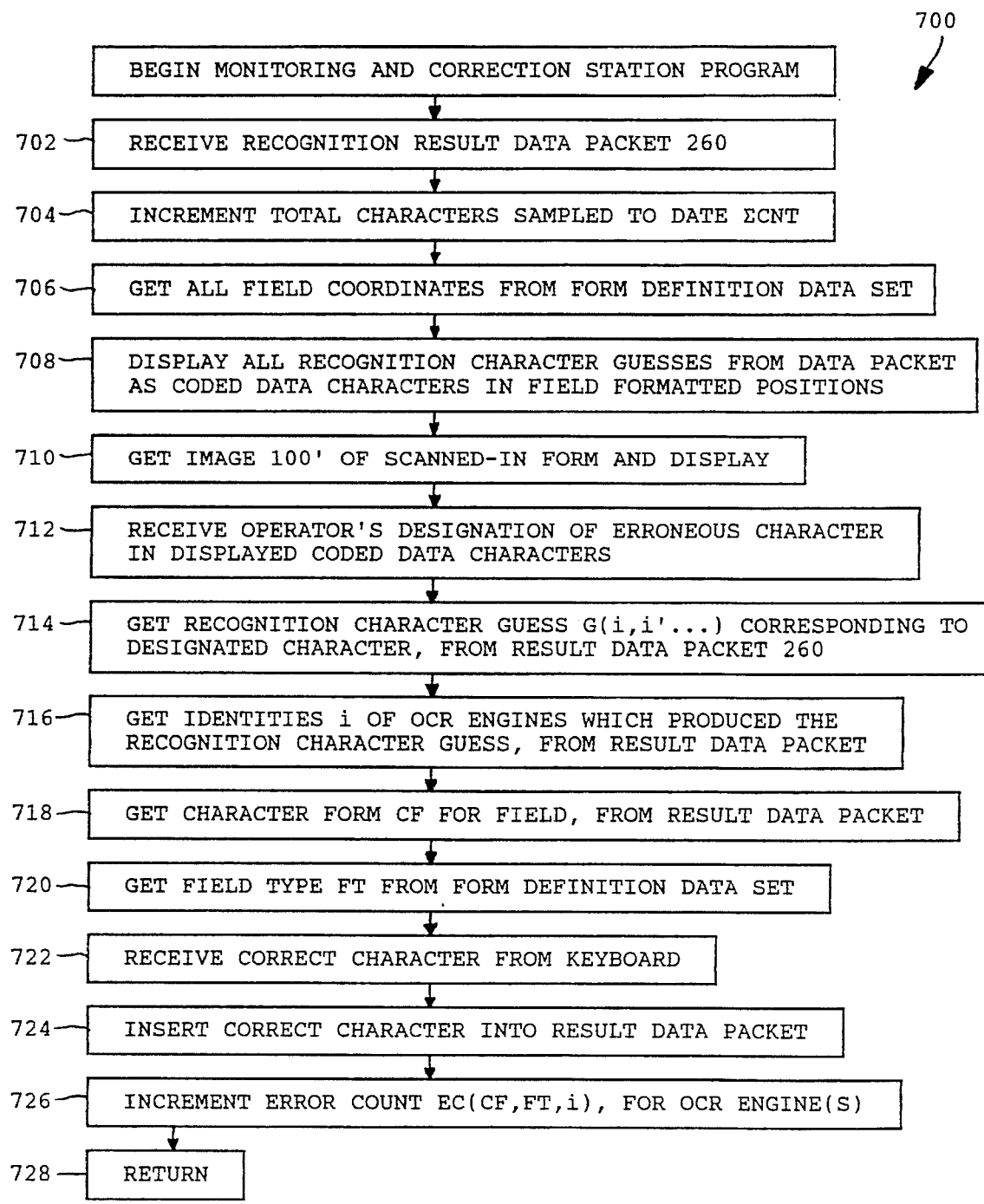
FIG. 6 is a flow diagram of the monitoring and correction station program.

FIG. 6 is a flow diagram of the sequence of operational steps for the monitoring and correction station program 700. Step 702 receives the recognition result data packet 620. Step 704 increments the total characters sampled to date which is the sum CNT shown in table 802 of FIG. 8B. Step 706 gets all the field coordinates from the form definition data set for the particular form being analyzed. Step 708 displays all of the character recognition guesses from the data packet as coded data characters in field formatted positions in the partition 570 of FIG. 5. Step 710 gets the image 100' of the scanned-in form and displays it in the partition 560 of FIG. 5.

Step 712 of FIG. 6, receives the operator's designation of an erroneous character which is displayed in the coded data characters in the partition 570 of FIG. 5. Step 714 gets the recognition character guess G(i,i'. . . ) corresponding to the designated character, from the result data packet 260 in the partition 550 of FIG. 5. Step 716 gets the identities "i" of the character recognition programs which produce the recognition character guess, from the result data packet 260. Step 718 gets the character form CF for the field, from the result data packet 260. Step 720 gets the field type FT from the form definition data set. Step 722 receives the correct character from the keyboard, the operator having looked at the image being displayed as stored in the partition 560, and correctly interpreting the erroneous character. Then step 724 inserts the correct character into the result data packet 226. Then step 726 increments the error count EC, for the OCR engines which produce the error, and makes the entry into the error counts for the sampled packets table 800 shown in FIG. 8A. Then the program of FIG. 6 goes to step 728 which returns to the main program.

Figure 7:
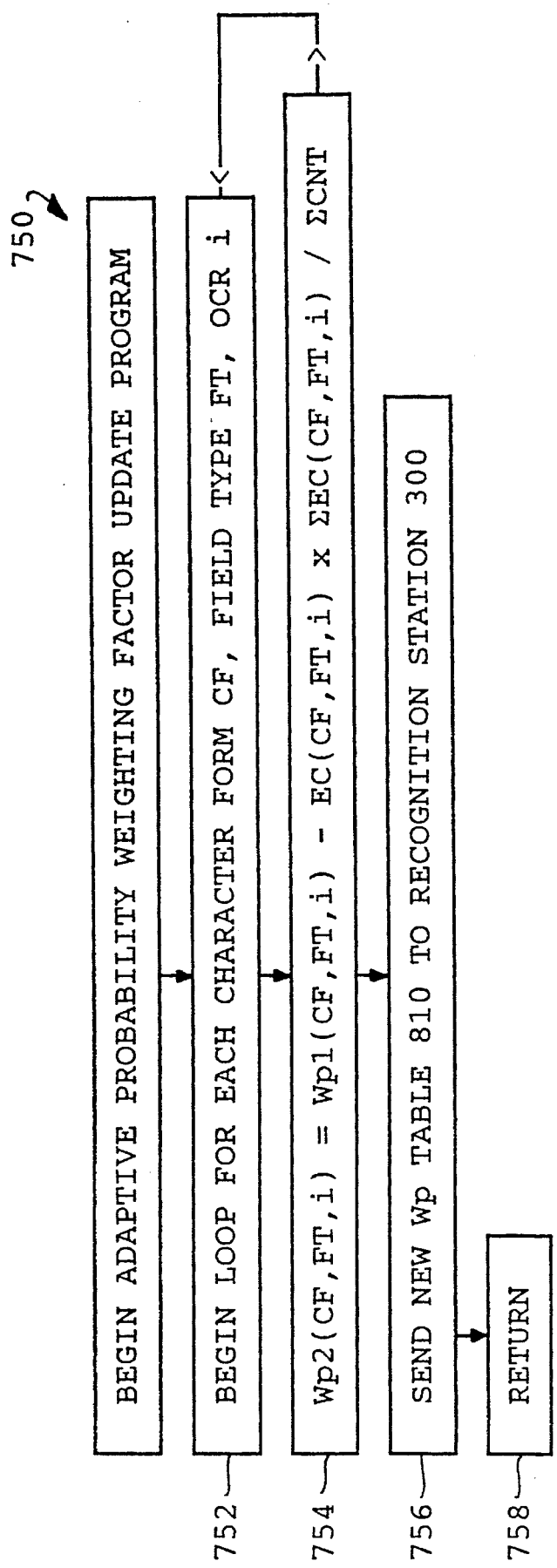
FIG. 7 is a flow diagram of the adaptive probability weighting factor update program.

FIG. 7 is a flow diagram of a sequence of operational steps for the adaptive probability weighting factor update program 750. Step 752 begins a loop for each character form CF, field type FT and character recognition program "i" or OCRi. This program can be executed in the monitoring and correction station 500 at the end of the day or at the end of any suitable period after error statistics have been accumulated and registered in the table 800 of FIG. 8A. The program flows to step 754 which performs a computation for the updated adaptive probability weighting factor Wp for each particular character recognition program processing each particular character form CF and field type FT. The updating of the adaptive probability weighting factor is done in this example by taking the existing adaptive probability weights in table 804 of FIG. 8C and for each weight, multiplying it times an adjustment value. In this example, the adjustment value is the error count EC times the sum of the error counts for the total characters sampled to date for this particular character recognition program and this particular combination of character form CF and field type FT, these values being stored in table 802 of FIG. 8B. This is then divided by the sum of all of the characters which have been sampled in all of the recognition result data packets 260. This tends to smooth out the short-term changes in error counts so that they do not unduly influence the accumulated adaptive probability weighting factor value which has been accumulated over a long period of time. Then, step 754 loops back to step 752 so that the loop is completed for each character form CF and each field type FT for each character recognition program "i." As a result, the existing adaptive probability weights WP1 in table 804 of FIG. 8C are converted into the new adaptive probability weights WP2 of table 810 of FIG. 8D. The new adaptive probability weights WP2 of table 810 are then sent to the recognition station 300, in step 756 of FIG. 7. Then the program of FIG. 7 flows to step 758 which returns to the main program.

As a result, the accumulated error statistics as represented by the error counts for the sampled packets in table 800 of FIG. 8A, is used to adjust the adaptive probability weights WP so that an updated table 810 can be produced which benefits from the knowledge acquired in monitoring the errors accumulated from applying the character recognition programs to a large number of filled-out forms under analysis.

Typically, a sampling of 10% of the forms which are character recognized, will produce a sufficient body of error count statistics to enable the updating of the adaptive probability weights in table 810 for optimizing the selection of the most accurate character recognition program to apply to a particular combination of character form and field types.

Although the three character recognition engines have been used in the above example for selecting the optimum character recognition engine for particular character forms and field types, other numbers of character recognition engines can be used and the above method applied.

The manual reject monitoring and correction station processor 500 can also include an automatic monitoring and correction processor 600, as shown in FIG. 4, which will automatically detect an error in the first guess character and generate a corrected character to substitute for the first guess character. This can be done for example in fields such as combinations of zip code and state fields. If an error is detected in a state field, the zip code which also appears on the same form in another field, can be used to access a zip code directory, for example, to determine what the correct state name is. The erroneous characters in the state field can then be corrected and the error correction statistics table 800 can correspondingly be incremented.

Although a particular embodiment of the invention has been shown, it will be understood by those having skill in the art that changes can be made to that specific embodiment without departing from the spirit and the scope of the invention.

What is claimed is:

1. In a data processing system, including a scanner, a plurality of character recognition means, a recognition station processor and a monitoring and correction station processor, a method for selecting which one of said plurality of character recognition means to use for recognizing a character in a field in a document image, comprising the steps of:

generating a character form confidence factor in the recognition station processor, for each of said plurality of character recognition means;

generating a field type confidence factor in the recognition station processor, for each of said plurality of character recognition means;

inputting an adaptive probability weighting factor from said monitoring and correction station processor to said recognition station processor, for each of said plurality of character recognition means;

generating a first guess character and first confidence value and a second guess character and second confidence value, using each of said plurality of character recognition means;

computing a recognition means choice confidence factor in said recognition station processor, as a product of said character form confidence factor, said field type confidence factor, and said adaptive probability weighting factor, times a difference between said first confidence value and said second confidence value; and selecting one of said plurality of character recognition means in said data processing system, having a maximum value for said recognition means choice confidence factor.

2. The method of claim 1, which further comprises:

accumulating an error count in said monitoring and correction station processor for one of said plurality of character recognition means in said data processing system;

computing a new value for said adaptive probability weighting factor in said monitoring and correction station processor, for at least one of said plurality of character recognition means, by modifying said adaptive probability weighting factor with a value derived from said error count.

3. The method of claim 2, which further comprises:

computing a recognition means choice confidence factor in said recognition station processor, as the product of said character form confidence factor, said field type confidence factor, and said new value for said adaptive probability weighting factor, times a difference between said first confidence value and said second confidence value.

4. The method of claim 1, which further comprises:

monitoring and correcting said first guess character in a manual monitoring and correction station processor in said data processing system;

accumulating an error count for one of said plurality of character recognition means in said monitoring and correction station processor; and computing a new value for said adaptive probability weighting factor in said monitoring and correction station processor, for at least one of said plurality of character recognition means, by modifying said adaptive probability weighting factor with a value derived from said error count.

5. The method of claim 1, which further comprises:

monitoring and correcting said first guess character in an automatic monitoring and correction station processor in said data processing system;

accumulating an error count for one of said plurality of character recognition means in said data processing system; and computing a new value for said adaptive probability weighting factor in said recognition station processor, for at least one of said plurality of character recognition means, by modifying said adaptive probability weighting derived from said error count.

6. In a data processing system, including a plurality of character recognition means, a recognition station processor and a monitoring and correction station processor, a method for selecting which one of said plurality of character recognition means to use for recognizing a character in a field in a document image, comprising the steps of:

inputting an adaptive probability weighting factor from said monitoring and correction station processor to said station recognition processor for each of said plurality of character recognition means;

generating a first guess character and first confidence value and a second guess character and second confidence value in said character recognition means, using each of said plurality of character recognition means;

computing a recognition means choice confidence factor in said recognition station processor, as a function of a product comprising an adaptive probability weighting factor times a difference between said first confidence value and said second confidence value; and selecting in said recognition station processor one of said plurality of character recognition means, having a maximum value for said recognition means choice confidence factor.

7. In a data processing system, including a plurality of character recognition means and a recognition station processor, a method for selecting which one of said plurality of character recognition means to use for recognizing a character in a field in a document image, comprising the steps of:

generating a character form confidence factor in said recognition station processor, for each of said plurality of character recognition means;

generating a field type confidence factor in said recognition station processor, for each of said plurality of character recognition means;

generating a first guess character and first confidence value and a second guess character and second confidence value using each of said plurality of character recognition means;

computing a recognition means choice confidence factor in said recognition station processor, as a product of said character form confidence factor and said field type confidence factor, times a difference between said first confidence value and said second confidence value; and selecting in said recognition station processor one of said plurality of character recognition means having a maximum value for said recognition means choice confidence factor.

8. In a data processing system, including a plurality of: character recognition means, a recognition station processor and a monitoring and correction station processor, a method for selecting which one of said plurality of character recognition means to use for recognizing a character in a field in a document image, comprising the steps of:

inputting an adaptive probability weighting factor from said monitoring and correction station processor to said recognition station processor for each of said plurality of character recognition means;

generating a first guess character and first confidence value and a second guess character and second confidence value using each of said plurality of character recognition means;

computing a recognition means choice confidence factor in said recognition station processor as a product of said adaptive probability weighting factor, times a difference between said first confidence value and said second confidence value; and selecting in said recognition station processor one of said plurality of character recognition means having a maximum value for said recognition means choice confidence factor.

9. The method of claim 8, which further comprises:

accumulating an error count for one of said plurality of character recognition means in said monitoring and correction station processor;

computing a new value for said adaptive probability weighting factor in said monitoring and correction station processor, for at least one of said plurality of character recognition means, by modifying said adaptive probability weighting factor with a value derived from said error count.

10. The method of claim 9, which further comprises:

computing a recognition means choice confidence factor in said recognition station processor, as a product of said new value for said adaptive probability weighting factor, times a difference between said first confidence value and said second confidence value.

11. The method of claim 8, which further comprises:

monitoring and correcting said first guess character in a manual monitoring and correction station processor in said data processing system;

accumulating an error count for one of said plurality of character recognition means in said manual monitoring and correction station processor;

computing a new value for said adaptive probability weighting factor in said recognition station processor, for at least one of said plurality of character recognition means, by modifying said adaptive probability weighting factor with a value derived from said error count.

12. The method of claim 8, which further comprises:

monitoring and correcting said first guess character in the monitoring and correction station processor operated in an automatic mode;

accumulating an error count for one of said plurality of character recognition means in said monitoring and correction station processor;

computing a new value for said adaptive probability weighting factor in said recognition station processor, for at least one of said plurality of character recognition means, by modifying said adaptive probability weighting factor with a value derived from said error count.

13. In a data processing system, including a document image input means, a forms recognition means, a field extraction means, a recognition station processor, a monitoring and correction station processor and a plurality of character recognition means, a method for selecting which one of said plurality of character recognition means to use for a character in a field in a document image, comprising the steps of:

generating a character form confidence factor in said recognition station processor, for each of said plurality of character recognition means;

generating a field type confidence factor in said recognition station processor for each of said plurality of character recognition means;

generating an adaptive probability weighting factor in said recognition station processor, for each of said plurality of character recognition means;

generating a first guess character and first confidence value and a second guess character and second confidence value using each of said plurality of character recognition means;

computing an OCR engine choice confidence factor in said recognition station processor, as a product of said character form confidence factor, said field type confidence factor, and said adaptive probability weighting factor, times a difference between said first confidence value and said second confidence value;

selecting in said recognition station processor one of said plurality of character recognition means having a maximum value for said OCR engine choice confidence factor;

accumulating an error count for one of said plurality of character recognition means in said monitoring and correction station processor;

computing a new value for said adaptive probability weighting factor in said monitoring and correction station processor, for each of said plurality of character recognition means, by modifying said adaptive probability weighting factor with a value derived from said error count.

14. In a data processing system, including a plurality of character recognition means, an apparatus for selecting which one of said plurality of character recognition means to use for a character in a field in a document image, comprising:

a memory for storing a character form confidence factor for each of said plurality of character recognition means;

said memory storing a field type confidence factor for each of said plurality of character recognition means;

said memory storing an adaptive probability weighting factor for each of said plurality of character recognition means;

each of said plurality of character recognition means generating a first guess character and first confidence value and a second guess character and second confidence value;

a first processor means coupled to said memory and to at least one of said plurality of character recognition means, for computing a recognition means choice confidence factor, as a product of said character form confidence factor, said field type confidence factor, and said adaptive probability weighting factor, times a difference between said first confidence value and said second confidence value; and said first processor means including means for selecting one of said plurality of character recognition means in said data processing system, having a maximum value for said recognition means choice confidence factor.

15. The data processing system of claim 14, which further comprises:

a second processor including accumulating means coupled to said means for selection for accumulating an error count of said first guess character;

said second processor means computing a new value for said adaptive probability weighting factor for at least one of said plurality of character recognition means, by modifying said adaptive probability weighting factor with a value derived from said error count.

16. The data processing system of claim 15, which further comprises:

said first processor means coupled to said second processor means, for receiving said new value for said adaptive probability weighting factor and computing a recognition means choice confidence factor in said data processing system, as a product of said character form confidence factor, said field type confidence factor, and said new value for said adaptive probability weighting factor, times a difference between said first confidence value and said second confidence value.

17. The data processing system of claim 16, which further comprises:

a manual monitoring and correcting station in said data processing system, which houses said accumulator means and second processor means;

display means in said manual station, coupled to said selection means, for presenting said document image and said first guess character to an operator; and input means in said manual station for receiving a corrected character from said operator, to substitute for said first guess character.

18. The data processing system of claim 16, which further comprises:

an automatic monitoring and correcting means in said data processing system, coupled to said selection means, for automatically detecting an error in said first guess character and generating a corrected character to substitute for said first guess character.

19. In a data processing system, including a plurality of character recognition means a recognition station processor, and a monitoring and station processor, an apparatus for selecting which one of said plurality of character recognition means to use for a character in a field in a document image, comprising:

each of said plurality of character recognition means generating a first guess character and first confidence value and a second guess character and second confidence value;

means for inputting an adaptive probability weighting factor from said monitoring and correction station processor to said recognition station processor for each of said plurality of character recognition means;

a first processor means coupled to said memory and to each of said plurality of character recognition means, for computing a recognition means choice confidence factor, as a function of a product comprising an adaptive probability weighting factor times a difference between said first confidence value and said second confidence value;

selection means included in said first processor means, for selecting one of said plurality of character recognition means in said data processing system, having a maximum value for said recognition means choice confidence factor.

20. In a data processing system, including a plurality of character recognition means, an apparatus for selecting which one of said plurality of character recognition means to use for a character in a field in a document image, comprising:

a memory for storing a character form confidence factor for each of said plurality of character recognition means;

said memory storing a field type confidence factor for each of said plurality of character recognition means;

each of said plurality of character recognition means generating a first guess character and first confidence value and a second guess character and second confidence value;

a first processor means included in said memory and to each of said plurality of character recognition means, for computing a recognition means choice confidence factor, as a product of said character form confidence factor and said field type confidence factor, times a difference between said first confidence value and said second confidence value; and selection means coupled to said first processor means, for selecting one of said plurality of character recognition means in said data processing system, having a maximum value for said recognition means choice confidence factor.

21. In a data processing system, including a plurality of character recognition means, an apparatus for selecting which one of said plurality of character recognition means to use for a character in a field in a document image, comprising:

a memory for storing an adaptive probability weighting factor for each of said plurality of character recognition means;

each of said plurality of character recognition means generating a first guess character and first confidence value and a second guess character and second confidence value;

a first processor means coupled to said memory and to each of said plurality of character recognition means, for computing a recognition means choice confidence factor, as a product of said adaptive probability weighting factor, times a difference between said first confidence value and said second confidence value;

selection means coupled to said first processor means, for selecting one of said plurality of character recognition means in said data processing system, having a maximum value for said recognition means choice confidence factor.

22. The data processing system of claim 21, which further comprises:

a second processor means including an accumulating means coupled to said selection means, for accumulating an error count of said first guess character; and second processor means computing a new value for said adaptive probability weighting factor for at least one of said plurality of character recognition means, by modifying said adaptive probability weighting factor with a value derived from said error count.

23. The data processing system of claim 22, which further comprises:

said first processor means coupled to said second processor means, for receiving said new value for said adaptive probability weighting factor and computing a recognition means choice confidence factor in said data processing system, as a product of said new value for said adaptive probability weighting factor, times a difference between said first confidence value and said second confidence value.

24. The data processing system of claim 23, which further comprises:

a manual monitoring and correcting station in said data processing system, which houses said accumulator means and second processor means;

display means in said manual station, coupled to said selection means, for presenting said document image and said first guess character to an operator;

input means in said manual station for receiving a corrected character from said operator, to substitute for said first guess character.

25. The data processing system of claim 23, which further comprises:

an automatic monitoring and correcting means in said data processing system, coupled to said selection means, for automatically detecting an error in said first guess character and generating a corrected character to substitute for said first guess character.

* * * * *